United States Patent

Conrad et al.

[11] Patent Number: 6,162,283
[45] Date of Patent: Dec. 19, 2000

[54] METHOD AND APPARATUS FOR CONCENTRATING A GAS USING A SINGLE STAGE ADSORPTION ZONE

[75] Inventors: Wayne Ernest Conrad; Helmut Gerhard Conrad; Ted Szylowiec, all of Hampton, Canada

[73] Assignee: Fantom Technologies Inc., Welland, Canada

[21] Appl. No.: 09/270,111

[22] Filed: Mar. 16, 1999

Related U.S. Application Data

[63] Continuation-in-part of application No. 09/240,618, Feb. 1, 1999.

[51] Int. Cl.[7] .................................................. B01D 53/053
[52] U.S. Cl. .................................. 95/98; 95/105; 95/130; 96/130; 96/144
[58] Field of Search .................... 95/96–106, 130, 95/138; 96/108, 130, 143, 144

[56] References Cited

U.S. PATENT DOCUMENTS

| | | | |
|---|---|---|---|
| 3,572,008 | 3/1971 | Hankison et al. | 96/144 X |
| 3,659,399 | 5/1972 | Kauer, Jr. et al. | 96/130 X |
| 3,796,022 | 3/1974 | Simonet et al. | 95/130 X |
| 4,013,429 | 3/1977 | Sircar et al. | 95/130 X |
| 4,477,264 | 10/1984 | Kratz et al. | 95/130 X |
| 4,534,346 | 8/1985 | Schlaechter | 96/144 X |
| 4,561,865 | 12/1985 | McCombs et al. | 95/130 X |
| 4,636,226 | 1/1987 | Canfora | 96/130 X |
| 4,661,125 | 4/1987 | Haruna et al. | 55/26 |
| 4,869,733 | 9/1989 | Stanford | 55/21 |
| 4,892,566 | 1/1990 | Bansal et al. | 95/130 X |
| 4,973,339 | 11/1990 | Bansal | 55/31 |
| 5,458,677 | 10/1995 | VanderMolen | 96/144 X |
| 5,518,526 | 5/1996 | Baksh et al. | 95/130 X |
| 5,520,720 | 5/1996 | Lemcoff | 95/130 X |
| 5,529,607 | 6/1996 | Tan | 95/130 X |
| 5,679,134 | 10/1997 | Brugerolle et al. | 95/130 X |
| 5,772,737 | 6/1998 | Andreani et al. | 95/130 X |
| 5,785,740 | 7/1998 | Brugerolle et al. | 95/130 X |
| 5,882,380 | 3/1999 | Sircar | 95/130 X |
| 5,928,610 | 7/1999 | Moran et al. | 95/130 X |
| 5,961,694 | 10/1999 | Monereau et al. | 95/130 X |
| 5,997,611 | 12/1999 | Doong et al. | 95/130 X |

*Primary Examiner*—Robert H. Spitzer
*Attorney, Agent, or Firm*—Philip C. Mendes da Costa; Bereskin & Parr

[57] ABSTRACT

A method and apparatus for operating a pressure swing adsorption process having an adsorption zone is disclosed that may utilize only a single adsorption stage. The purge cycle is automatically commenced by a pressure build up in the enriched fluid vented from an adsorption zone.

38 Claims, 4 Drawing Sheets

METHOD AND APPARATUS FOR CONCENTRATING A GAS USING A SINGLE STAGE ADSORPTION ZONE

This application is a continuation-in-part application of application Ser. No. 09/240,618, filed on Feb. 1, 1999.

FIELD OF THE INVENTION

This invention relates to a method and apparatus using a single adsorption zone for producing an enriched stream of a first gas from a stream containing the first gas and at least one second gas. In one embodiment, the method and apparatus may be used to obtain a concentrated stream of oxygen from air.

BACKGROUND OF THE INVENTION

Various different methods have been developed for separating gases and producing a concentrated stream of a selected gas. One particular method which has been used in industry is the pressure swing adsorption process. Generally, these processes use an adsorbent which, under elevated pressure conditions, preferentially adsorbs a targeted gas over other gases present in a gas stream. Accordingly, the adsorbent could be selected to preferentially adsorb an undesirable gas from a gas stream thereby leaving a gas stream having an increased concentration of the gases remaining in the gas stream. An example of such a process would be the use of a pressure swing adsorption process to produce an oxygen enriched air stream. The adsorbent would be selected to preferentially adsorb nitrogen over oxygen. Thus, after the adsorption process is conducted, the pressurized air in contact with the adsorbent contains a higher percentage by volume of oxygen. This oxygen enriched air may then be vented from the adsorption zone and the adsorbent purged (at reduced pressure conditions) to remove the adsorbed nitrogen. Alternately, such a process may be used to preferentially adsorb a targeted gas (e.g. oxygen) thereby also producing an enriched stream of oxygen.

Various different processes have been designed to utilize the selective adsorption ability of zeolite. Examples of these include, Bansal (U.S. Pat. No. 4,973,339), Stanford (U.S. Pat. No. 4,869,733) and Haruna et al (U.S. Pat. No. 4,661,125).

The process and apparatus of Bansal, Stanford and Haruna et al each utilize two adsorption zones. The use of two adsorption zones is undesirable as it unnecessarily complicates the apparatus since it requires additional valving and control means to cycle each adsorption bed through a pressurization cycle and a purging cycle. Further, this adds to the cost of the apparatus and decreases the reliability of the apparatus.

Other disadvantages of existing designs is the requirement to use expensive valve control means. In particular, solenoids are frequently required to switch the adsorption zone from a pressurization mode to a purging mode. These controls are expensive and also prone to failure after extensive use.

Further, existing designs utilize electronics (e.g. microprocessors) to control the cycling of the adsorption zone. This adds to the cost of the equipment and also requires an electrical power source to operate the process. Further, the electronic components may be damaged in harsh environments and this limits the applications of some existing designs.

SUMMARY OF THE INVENTION

According to the instant invention, the pressurization of a member such as a storage container for a portion of the concentrated gas may be used to actuate the purging cycle when the storage container pressurizes to a desired level. Accordingly, an electronic controller is not required to time the process. Further, no gas sensors are required to determine when to actuate a particular part of the cycle of the adsorption zone.

A further advantage of the instant invention is that the pressure actuatable member may be drivingly linked to the purge valve. In this embodiment, simple actuation means may be used to move the purge valve to the open position so as to initiate the purge cycle. Accordingly, solenoids and other complicated switching apparatus are not required. Further, the pressure actuatable member may itself move (eg. by resiliently expanding or by itself moving such as if it is a piston) to contact the purge valve. Accordingly, no electrical power supply is required to initiate the purging cycle.

According to the instant invention there is provided a concentrator for obtaining an enriched stream of a first fluid from a stream containing the first fluid and at least one second fluid, the concentrator comprising:

(a) a pressurizable adsorption zone having an inlet port for introducing the fluid stream to the adsorption zone, the pressurizable adsorption zone operable to produce the enriched stream;

(b) a pressurizable container for receiving at least a portion of the enriched fluid stream;

(c) a passageway extending between the pressurizable adsorption zone and the pressurizable container;

(d) an enriched fluid outlet for delivering at least a portion of the enriched fluid stream downstream of the concentrator;

(e) a purge valve in flow communication with the pressurizable adsorption zone and moveable between a closed position and an open position in which the pressurizable adsorption zone is purged during a purging cycle; and, (f) a mechanical displaceable member operably associated with the purge valve to move the purge valve from its closed position to its open position, the displaceable member being in flow communication with the pressurizable container and moveable outwardly between a charging position in which the pressurizable container is being pressurized and an actuating position in which the purge valve is in its closed position upon the pressurizable container reaching a preset pressure.

The displaceable member may be biased to the charging position (i.e. the position during which the pressurizable adsorption zone is pressurized to produce the enriched stream and the pressurizable container receives enriched fluid to commence the pressure build up that will cause the displaceable member to commence moving). For example, the displaceable member may be a rigid member (eg. a piston) which moves outwardly from the pressurizable container along a pathway (eg. the bore in which the piston travels) from the charging position to the actuating position. A spring, a resilient member or other biasing means may be provided to bias the rigid member to charging position. Alternately, the displaceable member may itself be the biasing member, such as if the displaceable member is a resilient member (eg. an elastomeric diaphragm). The resilient member may alternately form part of a wall of the pressurizable container.

In one embodiment, the resilient member contacts the purge valve when in the actuating position. For example, the purge valve may be spaced from and positioned outwardly from the displaceable member so as to be contacted by the displaceable member as the displaceable member moves to the actuating position. Alternately, the contactor may also comprise a linking member having a first portion and a second portion (eg a pivotally mounted member having first and second arms positioned on opposed sides of the pivot point). Thus, the second portion may be operatively connected to the purge valve and the resilient member may contact the first portion when in the actuating position. The mechanical linkage may be another form of lever, a cam member or the like.

In another embodiment, the purge valve is spaced from and positioned outwardly (and preferably directly outwardly) from the displaceable member and is contacted by the displaceable member as the displaceable member moves to the actuating position.

The purge valve is preferably a mechanical valve and more preferably is a pressure actuated mechanical valve (such as a spring loaded check valve).

In accordance with the instant invention, there is also provided a pressure swing adsorption apparatus for producing an enriched stream of a first fluid from a stream containing the first fluid and at least one second fluid, the apparatus comprising:
  (a) means for reversibly adsorbing the at least one second fluid to produce the enriched stream;
  (b) pressurizable storage means for receiving at least a portion of the enriched stream;
  (c) outlet means in flow communication with the storage means for venting at least a portion of the enriched stream from the apparatus;
  (d) purging means for removing at least a portion of the at least one second fluid from the means for reversibly adsorbing the at least one second fluid during a purging cycle; and,
  (e) actuating means operably associated with the purging means for actuating the purging cycle upon the pressurizable storage means reaching a preset pressure.

In accordance with the instant invention, there is also provided a method for producing an enriched fluid having an increased concentration of a first fluid from a stream containing the first fluid and at least one second fluid comprising the steps of:
  (a) the step of introducing the stream into a vessel containing a member for adsorbing the at least one second fluid;
  (b) the step of pressurizing the vessel for a time sufficient for the member to adsorb at least a portion of the second fluid to produce the enriched fluid;
  (c) the step of cyclically passing the enriched fluid to a pressurizable container to pressurize the pressurizable container; and,
  (d) the step of driving a member by the pressure in the pressurizable container to commence a purging cycle of the vessel when the pressurizable container reaches a preset pressure.

In one embodiment, the member mechanically drives an actuator of a purge valve to commence the purging cycle and the method further comprises automatically commencing the purging cycle when the pressurizable container reaches a preset pressure.

In another embodiment, the member is biased to a first position and mechanically drives an actuator of a purge valve to commence the purging cycle when in a second position and the method further comprises moving the member to contact the actuator due to the pressure increase in the pressurizable container.

In another embodiment, the member comprises a resilient member and the method further comprises the step of deforming the resilient member by the pressure in the pressurizable container to commence the purging cycle.

In accordance with the instant invention, there is also provided a method for producing an enriched fluid having an increased concentration of a first fluid from a stream containing the first fluid and at least one second fluid comprising:
  (a) introducing the stream into a vessel containing an adsorbent for adsorbing the at least one second fluid;
  (b) pressurizing the vessel for a time sufficient for the adsorbent to adsorb at least a portion of the second fluid to produce the enriched fluid and venting enriched fluid from the vessel; and,
  (c) using the enriched fluid vented from the vessel to pressurize a member to commence a purge cycle of the adsorbent.

In one embodiment, the member mechanically drives an actuator of a purge valve to commence the purging cycle and the method further comprises automatically commencing the purge cycle when the pressure of the enriched fluid moves the member by a preset amount.

In another embodiment, the member is biased to a first position and mechanically drives an actuator of a purge valve to commence the purging cycle when in a second position and the method further comprises moving the member to contact the actuator due to the pressure of the enriched fluid.

In another embodiment, the member comprises a resilient member and the method further comprises the step of deforming the resilient member by the pressure of the enriched fluid to commence the purging cycle.

It will be appreciated that, according to the instant invention, a concentrator, and in a preferred embodiment an oxygen concentrator, may be designed wherein a source of pressurized gas (eg. air) which is fed to the adsorption zone is the driving source of the entire apparatus. Accordingly, the resultant device, which uses only an external motive force, may be manufactured as a lightweight reliable unit.

In accordance with the instant invention, the apparatus may be designed to trigger the end of the purging cycle and thereby commence the pressurization or charging or adsorption cycle as the member contracts to a pre-determined position. This position may be pre-determined based upon the volume of the adsorption zone and the time required to complete the purging cycle as well as the flow rate of enriched gas from the contactor.

In accordance with the instant invention, the apparatus may be designed to trigger the end of the adsorption cycle (i.e. the end of the pressurization of the vessel wherein enriched air is vented from the vessel), the beginning of the venting cycle (i.e. the beginning of venting enriched air from the vessel), the end of the venting cycle (i.e. the end of the step of venting enriched air from the vessel), the beginning of the purge cycle (i.e. wherein purge air is introduced to the vessel to purge the vessel) and the end of the purge cycle (i.e. wherein the flow of purge air to the vessel is terminated and the adsorption cycle recommences) using essentially only the pressure of the stream fed to the vessel.

Further, the apparatus is energy efficient since the timing of these cycles is based upon the actual completion of a cycle (i.e. the expansion or contraction of a pressure displaceable member) as opposed to an electronic timing means which would initiate a cycle regardless of the concentration of the enriched gas exiting the apparatus.

BRIEF DESCRIPTION OF THE DRAWINGS

These and other advantages of the instant invention will be more fully and particularly understood in connection with the following description of a preferred embodiment of the invention in which.

DESCRIPTION OF PREFERRED EMBODIMENT

Concentrator 10 comprises inlet passage 12, outlet passage 14, adsorption zone 16 and a container 18. Passageway 20 extends between adsorption zone 16 and container 18.

Figure 2:
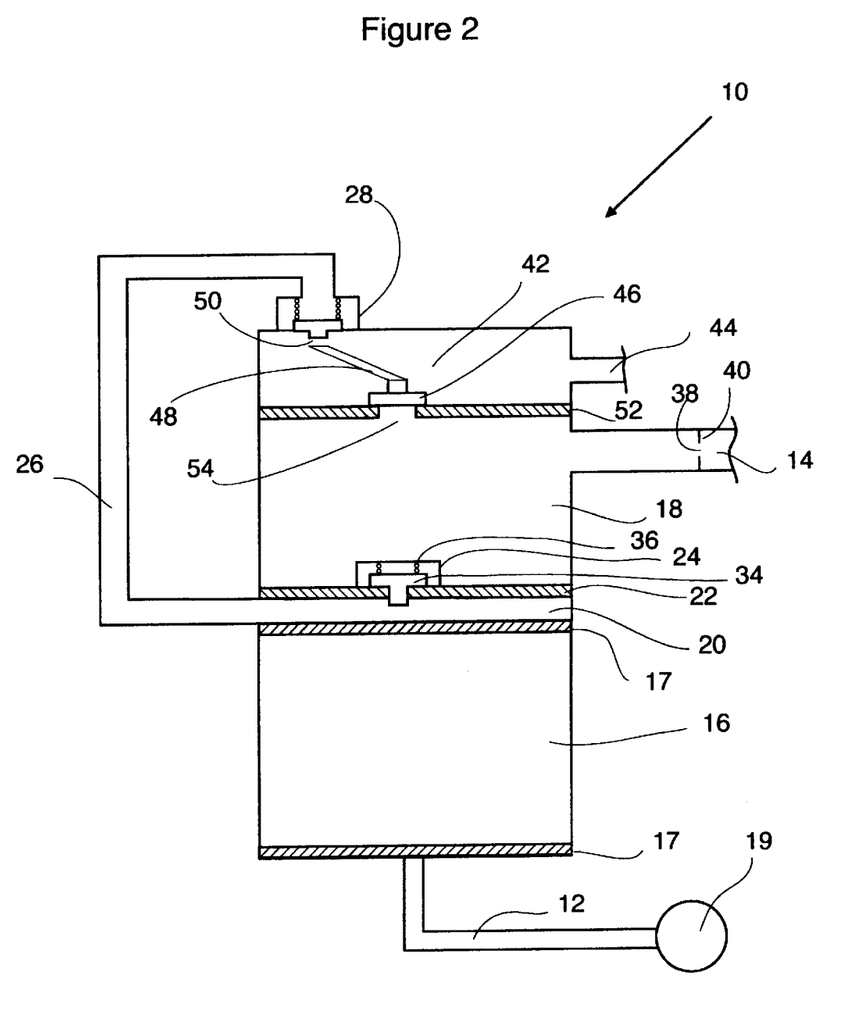
FIG. 2 is an alternate embodiment of the concentrator of FIG. 1.
Figure 3:
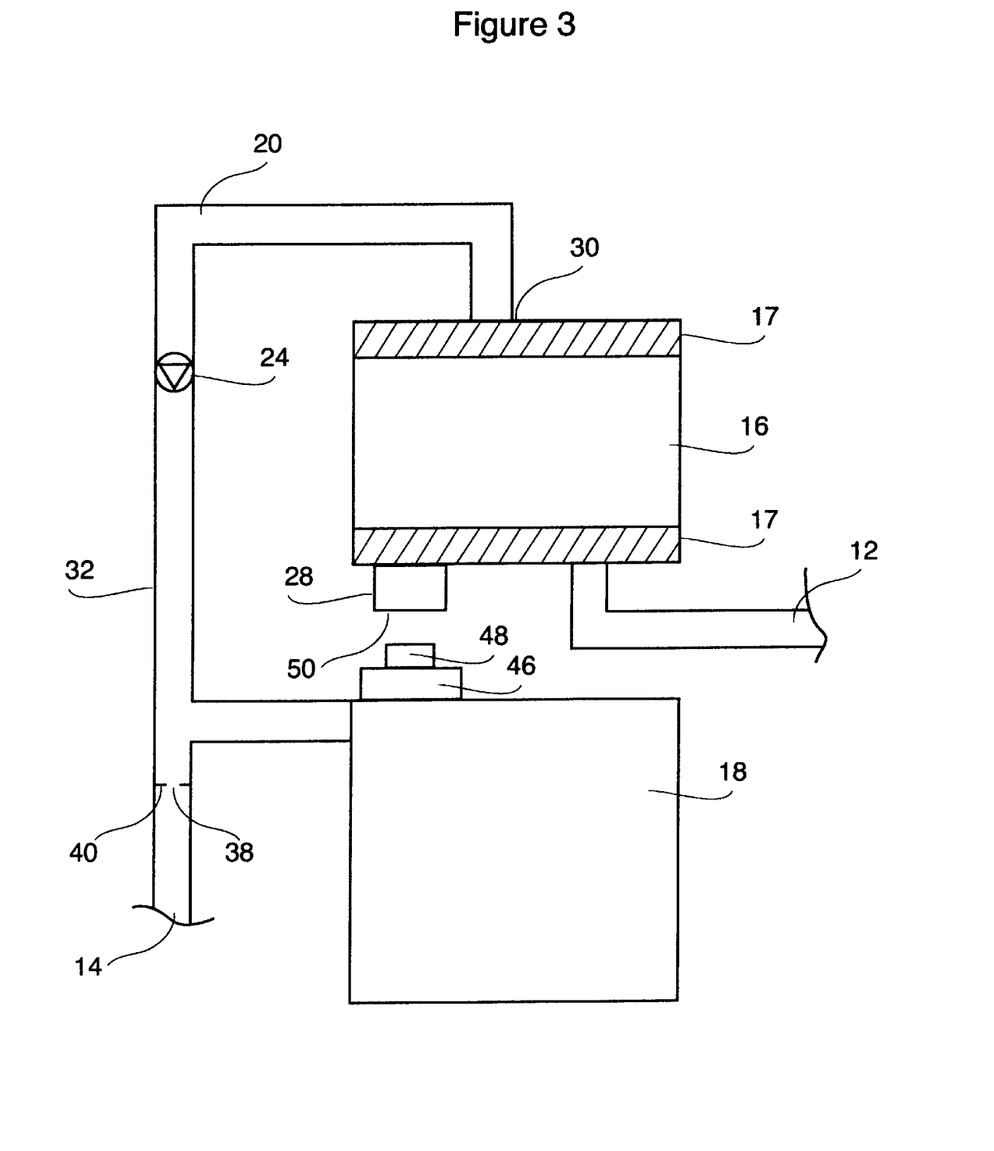
FIG. 3 is a second alternate embodiment of the concentrator of FIG. 1.

Adsorption zone 16 may be of any particular construction which is known in the art for pressure swing adsorption apparatus. As shown in FIG. 3, the adsorption zone 16 may comprise a vessel distinct from container 18 or it may be contained in the same housing as container 18 (see FIGS. 1, 2 and 4). Adsorption zone 16 is subjected to an increased pressure during which a selected fluid is adsorbed into adsorption media provided in adsorption zone 16 leaving a fluid having an increased concentration of the remaining (unadsorbed) fluids in adsorption zone 16. It will be appreciated that adsorption zone 16 may comprise a bed containing the adsorbent material through which the fluid flows as it passes through adsorption zone 16. The adsorbent may be discrete particles which are positioned between porous material 17 which functions to retain the adsorbent in adsorption zone 16.

The fluid may be a liquid or a gas. If the fluid is a liquid, then concentrator 10 may be used, for example, to selectively remove an impurity from a liquid stream (eg. the fluid selectively adsorbed into carbon) such as water or a pesticide. The concentrator may also be used for pressure swing fractional distillation.

In a preferred embodiment, the fluid is a gas and, more preferably, the concentrator is an oxygen concentrator. The following description is based upon the use of concentrator 10 as an oxygen concentrator; however, the concentrator may be used for other pressure swing operations of fluids.

If concentrator 10 is an oxygen concentrator, then the feed gas which is introduced into adsorption zone 16 via inlet passage 12 comprises an oxygen containing gas and, more preferably, air. The adsorbent material in adsorption zone 16 accordingly comprises a material which selectively adsorbs nitrogen (the largest constituent of air) thereby leaving air containing an enriched level of oxygen in adsorption zone 16. Such adsorbent material are known in the art. Examples of such material are zeolites and, in a particularly preferred embodiment, the adsorbent is clinoptilolite.

It will be appreciated that, in an alternate embodiment, the desired product may be the fluid adsorbed onto the adsorbent media. In such a case, the gas produced during the purge cycle could be fed to a container or other apparatus as may be desired.

The remaining part of this description of the preferred embodiment is premised upon concentrator 10 including an adsorbent to remove nitrogen from air thereby producing a stream of oxygen enriched air. It is to be understood that the feed gas stream fed to adsorption stream 16 may comprise at least any two gases and the adsorbent material may be selected to adsorb the one or more of such gases leaving a gas stream having an enhanced concentration of the remainder of such gases.

Adsorption zone 16 operates under pressure. Accordingly, means is provided to raise adsorption zone 16 to the desired pressure. In the preferred embodiment, inlet passage 12 is connected in flow communication to pump 19 which feeds pressurized air (eg. at a pressure of 3 to 30 psig, preferably from 5 to 15 psig) to inlet passage 12. It will be appreciated that, in an alternate embodiment, a compressor or other means may be provided as part of apparatus 10 to feed an air stream into adsorption zone 16 and to pressurize adsorption zone 16 to the required pressure. The exact pressure which is required for the adsorption media to adsorb the targeted gas, and the length of the adsorption cycle, will depend on the thermodynamics of the adsorption media.

Figure 1:
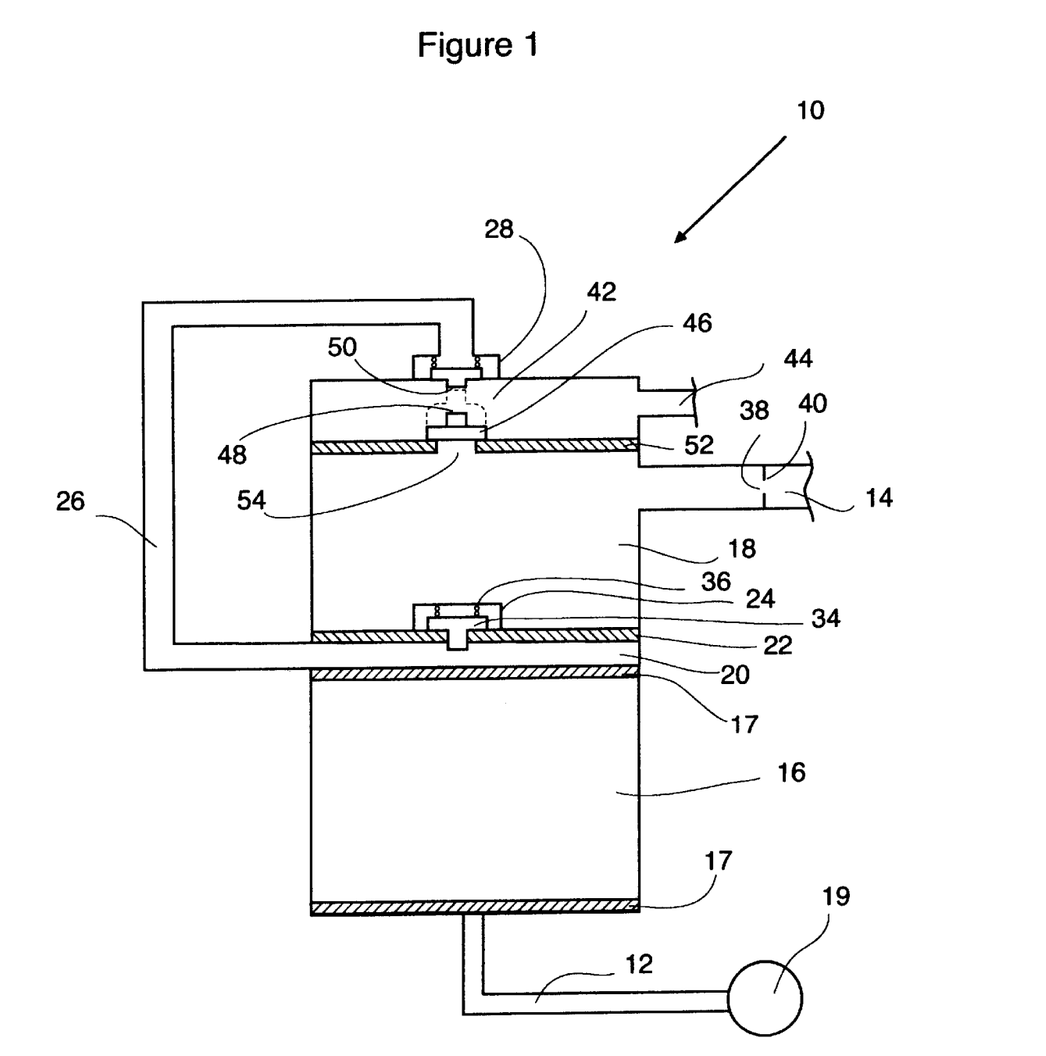
FIG. 1 is a view illustrating in diagrammatic form a single stage concentrator according to the instant invention.

In order to pressurize adsorption zone 16, adsorption zone 16 is capable of being sealed so that it will be pressurized, e.g. via the gas entering through inlet passage 12. In FIG. 1, apparatus 10 is provided with a bulkhead 22 having a check valve 24 provided therein. Further, passageway 20 is in flow communication with passageway 26 which is in flow communication with purge valve 28. When valves 24 and 28 are in the closed position, as shown in FIG. 1, adsorption zone 16 is sealed allowing the adsorbent positioned therein to selectively adsorb nitrogen.

Valve 24 may be any member which is moveable between a first position in which adsorption zone 16 is isolated from container 18 and an open position in which adsorption zone 16 and container 18 are in flow communication. Further, valve 24 may be positioned at any point between adsorption zone 16 and container 18. For example, in the embodiment shown in FIG. 3, adsorption zone 16 and container 18 are in flow communication via passageway 20. Valve 24 may be positioned at any point between first and second ends 30 and 32 of passageway 20.

While adsorption zone 16 is undergoing the adsorption portion of the cycle, adsorption zone 16 is sealed sufficiently such that adsorption zone 16 will be raised to the required pressure. It will be appreciated that valve 24 may allow some gas to exit therethrough so as to provide a more continuous flow of gas through outlet passage 14. Preferably, no gas flow out of adsorption zone 16 is permitted during this part of the method. Accordingly purge valve 28 is preferably in the fully closed position shown in FIG. 1 and valve 24 is preferably in the fully closed position shown in FIG. 1. Adsorption zone 16 is thus isolated so as to allow pressure to build up therein. Due to the inflow of air through inlet passage 12, pressure will build up in adsorption zone 16 and nitrogen will be adsorbed in the adsorbent media.

Based upon the volume of adsorption zone 16, the adsorption characteristics of the adsorbent in adsorption zone 16 and the rate of air input into adsorption zone 16, the length of time required to achieve the desired concentration of oxygen in the free gas in adsorption zone 16 may be calculated. Further, a person skilled in the art will be able to determine the pressure at which this desired oxygen concentration will be achieved.

Any valve mechanism (either mechanically or electrically operated) may be used for valve 24. Preferably, valve 24 is a pressure actuated member which will open to bring adsorption zone 16 into flow communication with container 18 when adsorption zone 16 reaches the pressure at which the required oxygen concentration will have been achieved (eg. a check valve). One advantage of this approach is that valve 24 may open, and the adsorption cycle therefore terminate, when a desired preset pressure (which may be determined from the desired oxygen concentration of the enriched gas) is achieved. Thus no sensors are required to monitor the progress of the adsorption cycle. The adsorption cycle automatically terminates when the requisite pressure is reached. Preferably, valve 24 is a mechanical member (eg. valve member 34) which is biased (eg. by an elastomeric member, a spring 36 or the like) to the closed position and which will open when the pressure upstream thereof (i.e. in adsorption zone 16 and in passageway 20) reaches a preset pressure (which may be the pressure at which the desired concentration of oxygen is achieved in the free gas in adsorption zone 16).

When valve 24 is in the open position, oxygen enriched air will pass from adsorption zone 16 through passageway 20 and into container 18. Outlet passage 14 is in flow communication with container 18. When valve 24 is in the open position, outlet passage 14 is also, indirectly, in flow communication with adsorption zone 16.

In a preferred embodiment, outlet passage 14 has an aperture 38 which is open at all times when concentrator 10 is in operation. Aperture 38 is preferable of a pre-set opening size so as to provide a generally continuous flow of oxygen enriched air through outlet passage 14 while oxygen enriched air is flowing into container 18. To this end, outlet passage 14 preferably has a reduced flow rate of gas therethrough than the flow rate of air into adsorption container 18 via valve 24. This may be achieved by providing flow restrictors 40 to create aperture 38. It will be appreciated that decreasing the size of passageway 14 may achieve a similar result.

It will also be appreciated that, if desired, aperture 38 may have a variable opening size so as to vary the flow rate of oxygen enriched air through outlet passage 14. Further, aperture 38 may be operable so as to seal outlet passage 14 (or alternately a valve to close outlet passage 14 may be provided). This may be desirable if, for example there is back pressure from downstream equipment.

The flow rate of oxygen enriched gas from outlet passage 14 is less than the flow rate of oxygen enriched gas into container 18 via valve 24. Accordingly, the pressure in container 18 will build up due, for example, to the size of aperture 38 which is created by flow restrictors 40.

Passageway 26 is selectively connectable in flow communication with a low pressure zone (eg. the atmosphere) via purge valve 28. As shown in FIG. 1, purge valve 28 is positioned between the downstream end of passageway 26 and header space 42. Space 42 may be vented to the atmosphere via outlet passageway 44. Accordingly, when purge valve 28 is in the open position, gas may flow through passageway 26, through purge valve 28, through header space 42, through passageway 44 to the atmosphere.

As shown in FIG. 3, passageway 20 is in flow communication via check valve 24 with container 18 and outlet passage 14 (which is provided external to container 18). When a sufficient pressure builds up in adsorption zone 16, check valve 24 opens permitting oxygen enriched gas to pass through passageway 20 into container 18 and, simultaneously, out of outlet passageway 14 via, for example, aperture 38. In this case, purge valve 28 is provided in the housing of adsorption zone 16. In this embodiment, when purge valve 28 is open, pressurized air will pass from adsorption zone 16 through purge valve 28 to, for example, the atmosphere thus reducing the pressure in adsorption zone 16 and causing check valve 24 to move to the closed position.

Referring to FIG. 1, container 18 has a pressure displaceable member 46 associated therewith. Pressure displaceable member 46 may be any member which moves outwardly relative to the interior of container 18 as pressure increases in container 18. For example, as shown in FIG. 1, pressure displaceable member 46 may be a resilient member (e.g. an elastomeric diaphragm) which expands outwardly (as represented by the dotted outline shown in FIG. 1) as the pressure increases in container 18. When sufficient pressure has built up in container 18, displaceable member 46 deforms to expand to a position such that actuator 48 (which is provided as part of displaceable member 46) contacts actuator 50 of purge valve 28. A further increase in pressure in container 18 will cause actuator 48 to displace actuator 50 such that purge valve 28 will move to the open position. Once this occurs, the purging cycle will commence.

During the purge cycle, pressurized air is preferably introduced into adsorption zone 16 via pump 19. As purge valve 28 is open, air will pass from adsorption zone 16 through passageways 20 and 26 to exit the contactor via purge valve 28 and passageway 44. This will reduce the pressure exerted on valve member 34 of valve 24 thus closing valve 24 and sealing container 18 from flow communication with adsorption zone 16. Container 18 may continue to depressurize by providing oxygen enriched air to passageway 14 via aperture 38. As the pressure in container 18 decreases, displaceable member 46 returns to its depressurized state (shown in solid line in FIG. 1) thus permitting valve 28 to move to the closed position. Once purge valve 28 is closed, the pressurization cycle of adsorption zone 16 may recommence. It will be appreciated that if a two way valve is used for valve 24, some of the gas in container 18 may flow back into adsorption zone 16 to assist in its purge cycle.

At the end of the purge cycle, the pressure in adsorption zone 16 may have been reduced to a pressure from about atmosphere to about 5 psig. Thus concentrator 10 may operate with a pressure swing between the peak pressure of the adsorption cycle and the low pressure of the purge cycle of 5 to 15 psig and, preferably 10 psig.

Displaceable member 46 may take a variety of forms. For example, as shown in FIG. 1, it may be a resilient deformable member. As such, it may expand and contract to its at rest position repeatedly as container 18 is cyclically pressurized. As such, a resilient diaphragm may be affixed to the upper surface of bulk head 52 above opening 54. Alternately, bulk head 52 may itself be a deformable member which expands and contracts with the pressurization and depressurization of container 18. It will be appreciated that pressure displaceable member may operate via other modes. For example, it may be a piston or other movable member mounted for movement between a first position in which the top of the movable member is spaced from actuator 50 (i.e. when container 18 is at a reduced pressure) and a second position in which the top of the movable member has displaced actuator 50 so as to open purge valve 28 (i.e. when container 18 is at an elevated pressure).

Accordingly, it will be understood that one advantage of the instant invention is that the purge cycle may be commenced automatically upon pressure displaceable member 46 being displaced a sufficient amount to cause actuator 50 to actuate purge valve 28. Accordingly, no sensing equipment is required to monitor the oxygen content of the oxygen enriched air exiting valve 24 and a controller is not required to automatically commence the purging cycle when the oxygen content of the oxygen enriched gas exiting valve 24 decreases below a desired amount.

A further advantage of the instant invention is that the purge cycle is automatically completed when container 18 depressurizes by an amount such that displaceable member 46 withdraws towards container 18 by an amount sufficient to allow actuator 50 to move to the closed position.

It will be appreciated that the length of the cycle during which oxygen enriched gas is provided via outlet 14 may be adjusted via the gap between actuators 48 and 50 and the pressure required to move pressure displaceable member 46 so as to actuate purge valve 28. For example, the greater the amount of pressure required to move pressure displaceable member 46, the greater the amount of time that oxygen enriched gas may be provided by outlet passage 14. Further, the greater the gap, the longer this time period may also be.

It will be appreciated that the orientation of pressure displaceable member 46 is not critical to the operation of contactor 10 provided that pressure displacement member 46 is biased to the closed position (e.g as shown in FIG. 1). For example, the orientation of contactor 10 may be inverted such that bulk head 52 is the bottom surface of container 18 as pressure displaceable member 46 may be a resilient member which, due to its resiliency, will maintain itself in the closed position. If a piston or other movable member is utilized, the movable member may be biased to the closed position by, for example, a spring, a resilient member, or other means known in the biasing art. It will further be appreciated that a separate actuator element 48 need not be provided on pressure displacement member 46.

It will be appreciated from FIG. 1 that pressure displaceable member 46 may be of any shape which will cause purge valve 28 to be actuated when pressure displaceable member 46 moves a preset distance. As shown in FIG. 1, purge valve 28 is positioned immediately above pressure displaceable member 46. As shown in FIG. 2, purge valve 28 is positioned above and to one side of pressure displaceable member 46. Accordingly, actuator 48 may be an arm member that extends at an angle so as to contact actuator 50 when pressure displaceable member 46 is sufficiently distended.

Referring to FIG. 3, an alternate embodiment is shown in which container 18 is positioned below adsorption zone 16. In this embodiment, purge valve 28 is positioned above pressure displaceable member 46. During the purge cycle, pressurized air is passed via inlet passageway 12 through adsorption zone 16 and is vented into the atmosphere via purge valve 28.

Figure 4:
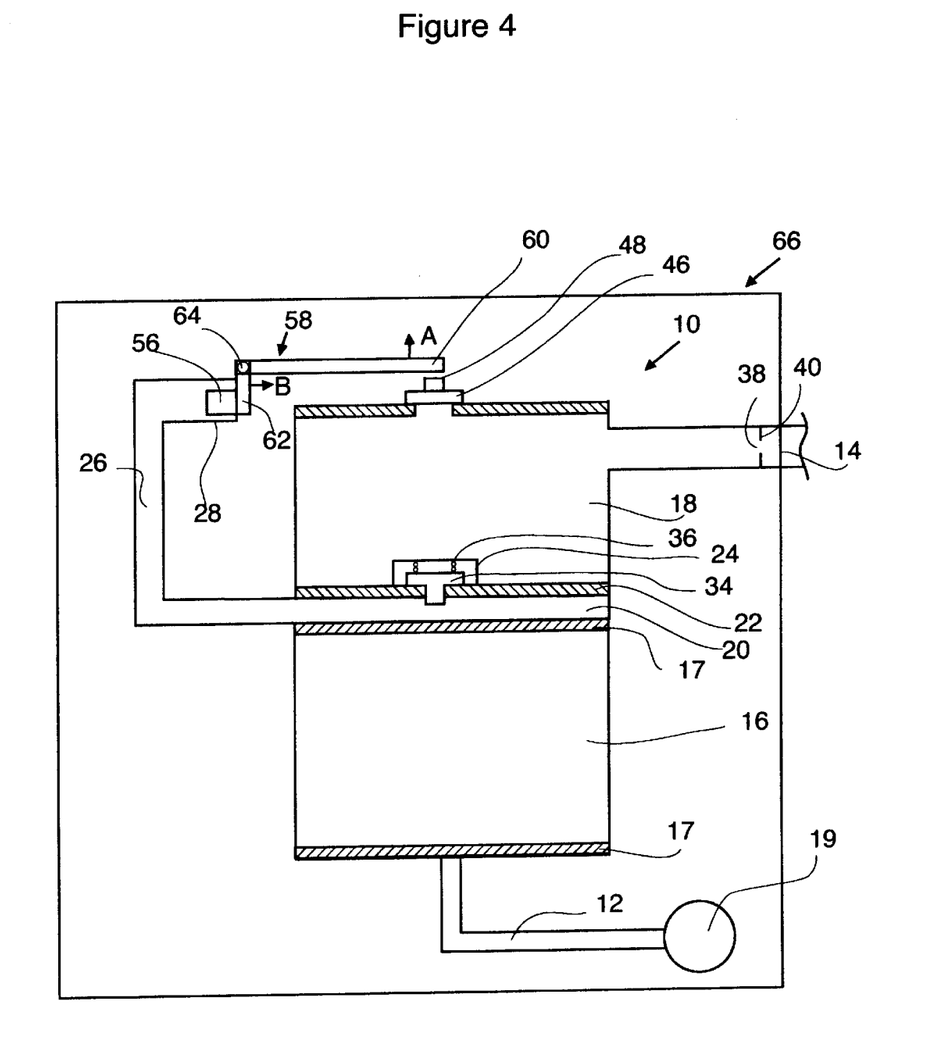
FIG. 4 is a third alternate embodiment of the concentrator of FIG. 1.

Referring to FIG. 4, a further alternate embodiment is shown. In this embodiment, purge valve 28 comprises a valve member 56 which sealing engages the distal end of passageway 26. Pressure displaceable member 46 is operably connected to valve member 56 via pivot member 58. Pivot member 58 has a first arm 60 and a second arm 62 positioned on opposed sides of pivot axle 64. The outward displacement of pressure displaceable member 46 causes first arm 60 to move upwardly as indicated by arrow A in FIG. 4. Pivot member 58 accordingly pivots about pivot axle 64 causing second arm 62 to move in the direction indicated by arrow B in FIG. 4 thus withdrawing valve member 56 from the distal end of passageway 26 thus permitting air to exit contactor 10. Pivot axle 64 may be mounted to, e.g. housing 66. Accordingly, pressure displaceable member 46 indirectly actuates purge valve 28.

By constructing a concentrator according to the instant invention, a repeatable cycle can be achieved using simple mechanical feedback (i.e. the interaction between purge valve 28 and pressure displaceable member 46). Pressure displaceable member 46 may be an expandable member (e.g. a resilient member) which will expand to actuate the purge valve due to a pressure increase in container 18. In an alternate embodiment, it may be a movable member such as a piston which moves outwardly from container 18 due to an increase in pressure in container 18. Pressure displaceable member 46 is biased to an at rest (depressurized) position by a biasing means which may be a spring or the inherent resiliency of a resilient diaphragm. Thus, by using simple mechanical linkages and movable or expandable elements, a concentrator having a simple rugged construction may be produced.

Another advantage of the instant invention is that the outward displacement of pressure displacement member 46 is used to time the purge cycle of adsorption zone 16. Accordingly, electronic timers or concentration sensors are not required to provide input to a controller to determine when the purge cycle should be commenced or terminated.

We claim:

1. A method for producing an enriched fluid having an increased concentration of a first fluid from a stream containing the first fluid and at least one second fluid comprising the steps of:

(a) the step of introducing the stream into a vessel containing a member for adsorbing the at least one second fluid:

(b) the step of pressurizing the vessel for a time sufficient for the member to adsorb at least a portion of the second fluid to produce the enriched fluid;

(c) the step of passing the enriched fluid to a pressurizable container to pressurize the pressurizable container; and, (d) the step of driving a member by the pressure in the pressurizable container to commence a purging cycle of the vessel when the pressurizable container reaches a preset pressure.

2. The method as claimed in claim 1 wherein the member mechanically drives an actuator of a purge valve to commence the purging cycle and the method further comprises automatically commencing the purging cycle when the pressurizable container reaches the preset pressure.

3. The method as claimed in claim 1 wherein the member is biased to a first position and mechanically drives an actuator of a purge valve to commence the purging cycle when in a second position and the method further comprises moving the member to contact the actuator due to the pressure increase in the pressurizable container.

4. The method as claimed in claim 1 wherein the member comprises a resilient member and the method further comprises the step of deforming the resilient member by the pressure in the pressurizable container to commence the purging cycle.

5. The method as claimed in claim 1 wherein the stream is at an elevated pressure and the method further comprises essentially only using the pressure of the stream to pressurize the vessel, to cyclically pass the enriched fluid to the pressurizable container and to commence the purging cycle.

6. A method for producing an enriched fluid having an increased concentration of a first fluid from a stream containing the first fluid and at least one second fluid comprising:

(a) introducing the stream into a vessel containing an adsorbent for adsorbing the at least one second fluid;

(b) pressurizing the vessel for a time sufficient for the adsorbent to adsorb at least a portion of the second fluid to produce the enriched fluid and venting enriched fluid from the vessel; and (c) using the enriched fluid vented from the vessel to pressurize a mechanical member to commence a purge cycle of the adsorbent.

7. The method as claimed in claim 6 wherein the member mechanically drives an actuator of a purge valve to commence the purging cycle and the method further comprises automatically commencing the purge cycle when the pressure of the enriched fluid moves the member by a preset amount.

8. The method as claimed in claim 6 wherein the member is biased to a first position and mechanically drives an actuator of a purge valve to commence the purging cycle when in a second position and the method further comprises moving the member to contact the actuator due to the pressure of the enriched fluid.

9. The method as claimed in claim 6 wherein the member comprises a resilient member and the method further comprises the step of deforming the resilient member by the pressure of the enriched fluid to commence the purging cycle.

10. The method as claimed in claim 6 wherein the stream is at an elevated pressure and the method further comprises using essentially only the pressure of the stream to pressurize the vessel, to vent enriched fluid from the vessel and to commence the purging cycle.

11. A concentrator for obtaining an enriched stream of a first fluid from a stream containing the first fluid and at least one second fluid, the concentrator comprising:
(a) an adsorption zone having an inlet port for introducing the fluid stream to the adsorption zone, the adsorption zone operable to produce the enriched stream;
(b) a pressurizable container for receiving at least a portion of the enriched fluid stream;
(c) a passageway extending between the adsorption zone and the pressurizable container;
(d) an enriched fluid outlet for delivering at least a portion of the enriched fluid stream downstream of the concentrator;
(e) a purge valve in flow communication with the adsorption zone and moveable between a closed position and an open position in which the adsorption zone is purged during a purging cycle; and
(f) a mechanical displaceable member operably associated with the purge valve to move the purge valve from its closed position to its open position, the displaceable member being in flow communication with the pressurizable container and moveable outwardly between a charging position in which the pressurizable container is being pressurized and an actuating position in which the purge valve is in its closed position upon the pressurizable container reaching a preset pressure.

12. The concentrator as claimed in claim 11 wherein the stream is at an elevated pressure when introduced to the adsorption zone and the elevated pressure of the fluid stream provides essentially the only motive force to operate the concentrator.

13. The concentrator as claimed in claim 11 wherein the displaceable member is biased to the charging position.

14. The concentrator as claimed in claim 13 wherein the displaceable member is a rigid member which moves outwardly from the pressurizable container along a pathway from the charging position to the actuating position.

15. The concentrator as claimed in claim 13 wherein the displaceable member is a resilient member.

16. The concentrator as claimed in claim 15 wherein the resilient member forms part of a wall of the pressurizable container.

17. The concentrator as claimed in claim 15 wherein the resilient member contacts the purge valve when in the actuating position.

18. The concentrator as claimed in claim 15 wherein the purge valve is spaced from and positioned outwardly from the displaceable member and is contacted by the displaceable member as the displaceable member moves to the actuating position.

19. The concentrator as claimed in claim 15 further comprising a linking member having a first portion and a second portion, the second portion operatively connected to the purge valve, the resilient member contacting the first portion when in the actuating position.

20. The concentrator as claimed in claim 11 wherein the purge valve is spaced from and positioned outwardly from the displaceable member and is contacted by the displaceable member as the displaceable member moves to the actuating position.

21. The concentrator as claimed in claim 11 wherein the purge valve is spaced from and positioned directly outwardly from the displaceable member and is contacted by the displaceable member as the displaceable member moves to the actuating position.

22. The concentrator as claimed in claim 11 wherein the purge valve is a mechanical valve.

23. The concentrator as claimed in claim 11 wherein the fluid comprises air, the first fluid is oxygen and the at least one second fluid comprises nitrogen.

24. A concentrator for obtaining an enriched stream of a first fluid from a stream containing the first fluid and at least one second fluid, the concentrator comprising:
(a) a pressurizable adsorption zone having an inlet port for introducing the fluid stream to the adsorption zone, the pressurizable adsorption zone operable to produce the enriched stream;
(b) a feed valve in flow communication with the inlet port and moveable between a closed position and an open position in which pressurized fluid is fed to the pressurizable adsorption zone;
(c) a pressurizable container for receiving at least a portion of the enriched fluid stream;
(d) a venting valve in flow communication with the pressurizable container and moveable between a closed position and an open position in which enriched fluid is vented from the pressurizable adsorption zone;
(e) an enriched fluid outlet for delivering at least a portion of the enriched fluid stream downstream of the concentrator;
(f) a purge valve in flow communication with the pressurizable adsorption zone and moveable between a closed position and an open position in which the pressurizable adsorption zone is purged during a purging cycle
wherein the elevated pressure of the fluid stream provides essentially the only motive force to operate the concentrator.

25. The concentrator as claimed in claim 24 wherein each of the feed valve, the venting valve and the purge valve is operable to move between its open and closed positions in response to pressure differences upstream and downstream of the respective valve.

26. A pressure swing adsorption apparatus for producing an enriched stream of a first fluid from a stream containing the first fluid and at least one second fluid, the apparatus comprising:
(a) means for reversibly adsorbing the at least one second fluid to produce the enriched stream;
(b) pressurizable storage means for receiving at least a portion of the enriched stream;
(c) outlet means in flow communication with the storage means for venting at least a portion of the enriched stream from the apparatus;

(d) purging means for removing at least a portion of the at least one second fluid from the means for reversibly adsorbing the at least one second fluid during a purging cycle; and, (e) mechanical actuating means operably associated with the purging means for actuating the purging cycle upon the pressurizable storage means reaching a preset pressure.

27. The apparatus as claimed in claim 26 wherein the actuating means is moveable between a charging position in which the pressurizable storage means is pressurized and an actuating position in which the purge cycle is actuated and the actuating means is biased to the charging position.

28. The apparatus as claimed in claim 27 wherein the actuating means is a rigid member which moves outwardly from the pressurizable storage means along a pathway from the charging position to the actuating position.

29. The apparatus as claimed in claim 27 wherein the actuating means is a resilient means.

30. The apparatus as claimed in claim 29 wherein the resilient means forms part of a wall of the pressurizable storage means.

31. The apparatus as claimed in claim 29 wherein the purging means has a purge actuator and the resilient means contacts the actuator when in the actuating position.

32. The apparatus as claimed in claim 31 wherein the purge actuator is spaced from and positioned outwardly from the resilient means and is contacted by the resilient means as the resilient means moves to the actuating position.

33. The apparatus as claimed in claim 29 further comprising mechanical linking means having a first portion and a second portion, the second portion operatively connected to the purging means, the resilient means contacting the first portion when in the actuating position.

34. The apparatus as claimed in claim 29 wherein the purging means is actuated when the resilient means expands by a set amount.

35. The apparatus as claimed in claim 26 wherein the purging means is spaced from and positioned outwardly from the actuating means and is contacted by the actuating means as the actuating means moves to the actuating position.

36. The apparatus as claimed in claim 26 wherein the purging means is spaced from and positioned directly outwardly from the actuating means and is contacted by the actuating means as the actuating means moves to the actuating position.

37. The apparatus as claimed in claim 26 wherein the purging means is a pressure actuated valve.

38. The apparatus as claimed in claim 26 wherein the fluid comprises air, the first fluid is oxygen and the at least one second fluid comprises nitrogen.

* * * * *